(12) United States Patent
Moussa et al.

(10) Patent No.: US 8,477,424 B2
(45) Date of Patent: Jul. 2, 2013

(54) DIFFRACTIVE COMBINER FOR MULTICOLOR AND MONOCHROME DISPLAY, METHOD OF MANUFACTURE AND HEAD-UP DISPLAY DEVICE USING SAME

(75) Inventors: Hassan Moussa, Illkirch (FR); Laurent Tupinier, Reichstett (FR); Idriss El Hafidi, Strasbourg (FR); Mandiaye Ndao, Strasbourg (FR)

(73) Assignees: Delphi Technologies, Inc., Troy, MI (US); Universite Louis Pasteur

(*) Notice: Subject to any disclaimer, the term of this patent is extended or adjusted under 35 U.S.C. 154(b) by 156 days.

(21) Appl. No.: 13/133,597

(22) PCT Filed: Dec. 9, 2009

(86) PCT No.: PCT/EP2009/066776
§ 371 (c)(1),
(2), (4) Date: Jul. 18, 2011

(87) PCT Pub. No.: WO2010/066818
PCT Pub. Date: Jun. 17, 2010

(65) Prior Publication Data
US 2011/0261465 A1    Oct. 27, 2011

(30) Foreign Application Priority Data

Dec. 9, 2008 (EP) .................................... 08171134
Dec. 10, 2008 (EP) .................................... 08171219

(51) Int. Cl.
*G02B 27/14* (2006.01)
(52) U.S. Cl.
USPC .................. 359/630; 359/3; 359/13; 359/15; 359/632; 345/7; 349/112

(58) Field of Classification Search
USPC ............... 359/3, 12–16, 567, 577, 630, 632, 359/637; 349/64, 106, 112; 345/7–9; 348/115; 430/1; 438/32
See application file for complete search history.

(56) References Cited

U.S. PATENT DOCUMENTS

| 4,874,213 | A   | 10/1989 | Cowan |
| 5,313,292 | A * | 5/1994  | Wood et al. .................... 359/13 |

(Continued)

FOREIGN PATENT DOCUMENTS

| JP | 10 048562   | 2/1998  |
| WO | 98/12582    | 3/1998  |
| WO | 2006/135587 | 12/2006 |

OTHER PUBLICATIONS

International Search Report dated Mar. 8, 2010.

*Primary Examiner* — Loha Ben
(74) *Attorney, Agent, or Firm* — Lawrence D. Hazelton

(57) ABSTRACT

A method for producing a single-layer diffractive combiner for a head-up display having a projection unit with n light sources of $\lambda i$ wavelength(s), where $i=1$ to n sending light towards the combiner at an angle $\theta p$. The method includes forming interference fringes for each $\lambda i$ wavelength on a photosensitive layer with an interference of two light beams from a single laser source of wavelength $\lambda e$, where the forming step is repeated n times, and each time the forming step is repeated an angle $\theta i$ between the two beams is determined according to $\theta i = \arcsin((\lambda e/\lambda i)*\sin(\theta p))$, one of the interfering beams being divergent and having a spherical wave front and the other being a plane wave, the interference of the beams generating a diffractive network with an adjustable pitch and curved contour fringe lines.

20 Claims, 3 Drawing Sheets

U.S. PATENT DOCUMENTS

| | | | |
|---|---|---|---|
| 5,589,956 A * | 12/1996 | Morishima et al. | 359/15 |
| 5,615,023 A * | 3/1997 | Yang | 359/13 |
| 5,694,230 A | 12/1997 | Welch | |
| 5,760,931 A * | 6/1998 | Saburi et al. | 359/13 |
| 6,005,714 A | 12/1999 | Welch | |
| 6,075,579 A * | 6/2000 | Ueda et al. | 349/64 |
| 6,127,066 A * | 10/2000 | Ueda et al. | 430/1 |
| 6,384,883 B1 * | 5/2002 | Ueda et al. | 349/112 |
| 6,545,778 B2 * | 4/2003 | Ono et al. | 359/13 |
| 6,762,810 B2 * | 7/2004 | Ueda et al. | 349/112 |
| 7,579,119 B2 * | 8/2009 | Ueda et al. | 430/1 |
| 7,727,680 B2 * | 6/2010 | Ueda et al. | 430/1 |
| 2005/0200962 A1 | 9/2005 | Voloschenko et al. | |
| 2006/0279816 A1 | 12/2006 | Duncan | |
| 2013/0038935 A1 * | 2/2013 | Moussa et al. | 359/567 |

* cited by examiner

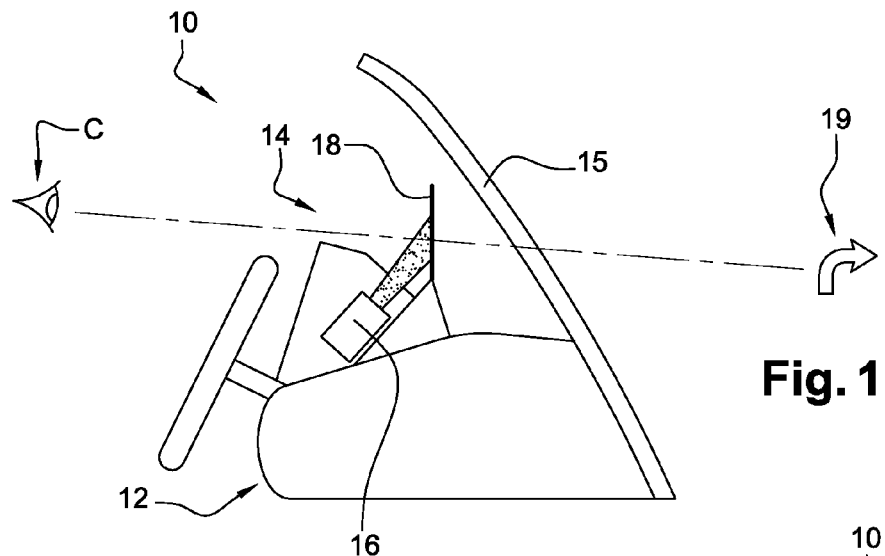
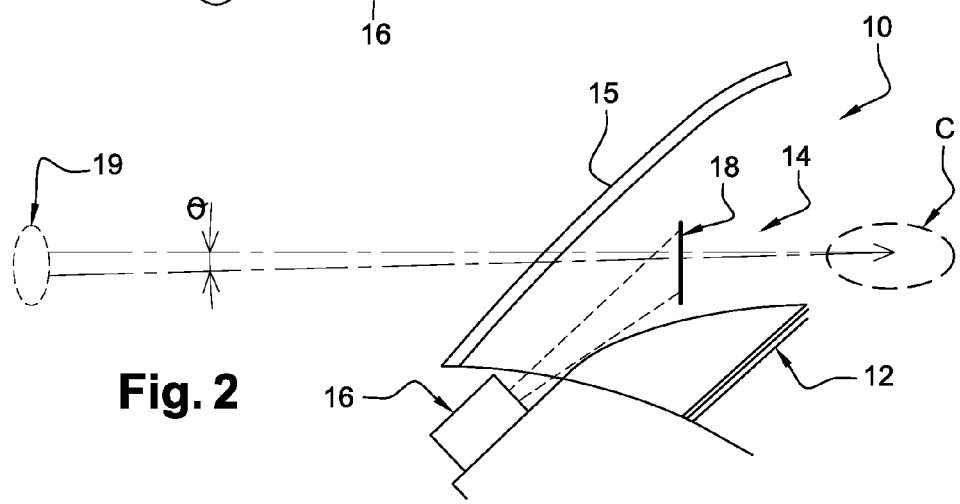
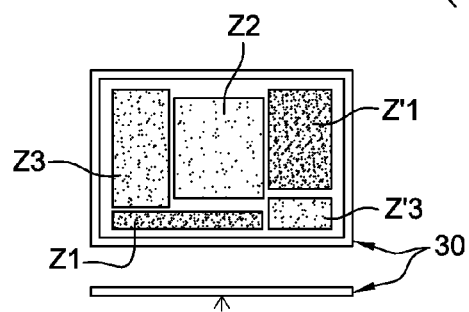
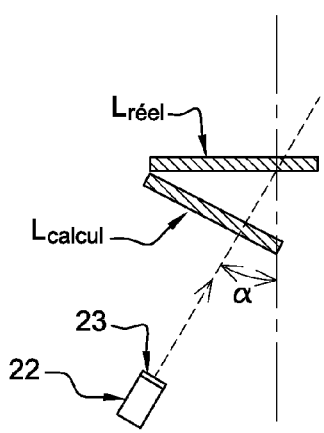

DIFFRACTIVE COMBINER FOR MULTICOLOR AND MONOCHROME DISPLAY, METHOD OF MANUFACTURE AND HEAD-UP DISPLAY DEVICE USING SAME

CROSS-REFERENCE TO RELATED APPLICATION

This application claims the benefit under 35 U.S.C. §371 of published PCT Patent Publication Number PCT/EP 2009/066776, filed Dec. 9, 2009, the entire disclosure of which is hereby incorporated herein by reference.

TECHNICAL FIELD

The present invention concerns a head-up display device for an automobile vehicle, and more particularly a method of manufacturing a diffractive combiner used in such a display device.

BACKGROUND OF INVENTION

This type of device, typically comprising a projection unit which produces a light beam designed to be directed towards a diffractive combiner for the purpose of projecting images, particularly information on functioning or driving of the vehicle, in the form of a virtual image situated in the driver's field of vision, was initially produced using technology derived from aeronautical applications. The manufacturing costs are therefore often considerable, liable to prevent them from being marketed and installed on a larger scale on lower cost vehicles.

These costs result in particular from the technology used, which is complicated to put into practice, and which further does not always allow mass replication of the combiners with sufficient guarantee of stability of optical characteristics. This is for example the case with the device disclosed in document JP10048562, describing a system which includes a hologram with index modulation, the manufacture of which is based on the use of photosensitive plates made from a gelatin-based photosensitive layer deposited on a substrate acting as a mechanical support. Such a component can be manufactured only singly, because it involves individualized recording, and it is not capable of mass manufacture at a reasonable industrial cost. The holographic component produced on this type of photosensitive plate is furthermore sensitive to UV radiation, which is capable of altering it, unless protective layers are added. This is also the case with the system disclosed in document EP0467328, showing a combiner with volumetric optical treatment manufactured on the basis of gelatins, and requiring several holographic layers interacting with several wavelengths, which makes reliable reproduction of the optical characteristics of the system even more uncertain. This system further works with reflected light only.

A system which functions with reflected light with several wavelengths is also described in document U.S. Pat. No. 4,930,847, with a recording method using both different geometry and wavelength, based on gelatin-type photosensitive materials which have the limitations set forth above.

Another structure with at least two layers is described in U.S. Pat. No. 6,005,714, where the multiplication of layers increases the difficulty of maintaining, in mass manufacture, correct stability of the optical function to be provided. The multilayer combiner with multilevel diffractive structures described in this document is manufactured by calculation carried out by computer, and suffers from the processing limitations of computers, allowing only reduced combiner dimensions for a finite number of levels of diffractive structures, which make it possible only to approximate the desired optical functions.

Manufacture resulting from calculations by computer is also described in document WO2004/09090607 which proposes a diffractive element which diffracts the light in several orders, superimposing the zero order of diffraction of ambient light on the first order of diffraction, and in particular requires a complex optical system of reproduction.

SUMMARY OF THE INVENTION

The present invention remedies these weaknesses, and proposes a solution which allows mass manufacture of a mono-layer combiner by a method operating very simply and superficially on a plate made of transparent plastic material.

The method of manufacture of the invention is conventionally carried out by nano-lithography by laser interference, and more precisely it allows mass production of a monolayer diffractive combiner used in a head-up display device for an automobile vehicle comprising a projection unit provided with a display backlit by $n \geq 1$ light source(s) of wavelength(s) $\lambda i$, where $i=1$ to $n$, illuminating at least one zone of said display, and sending a light beam towards said combiner at an angle $\theta p$. It conventionally comprises the following steps:

a) deposition of a photosensitive layer having a uniform thickness on a plane surface of a solid substrate;

b) exposure of the interference fringes on the photosensitive layer due to the interference of two light beams R1 and R2 emanating from a laser source;

c) conversion of the exposed zones corresponding to the interference fringes, to variations of relief in the photosensitive layer, and manufacture of a mold reproducing these variations; and d) use of said mold to transfer the diffractive relief structure of the substrate to a homogeneous transparent plastic element constituting the diffractive combiner.

The method of the invention is characterized mainly in that step b) is carried out n times, on the basis of two light beams R1 and R2 emanating from the same laser source of wavelength $\lambda e$, with an angle $\theta i$, where $i=1$ to $n$, between the beam R1 and the beam R2 equal to $$\theta_i = \arcsin\left(\frac{\lambda_e}{\lambda_i} \cdot \sin(\theta_p)\right), \quad \text{Eq. 1}$$

one of the interfering beams being divergent and having a spherical wave and the other being a plane wave, their interference generating a diffractive network with variable pitch with curved fringe contour lines.

The combiner produced by this method allows the reproduction of a virtual image in a single color, when $n=1$, or in several colors when $n>1$.

In fact, the first step of the method consists of the formation of a matrix for subsequent manufacture of molds allowing mass manufacture. This matrix consists of a substrate, made of rigid material, on which is deposited a photosensitive layer sensitive to the wavelength of the laser source used, which is always the same, only the angle between the two beams being modified from one step to the next.

Conventionally, the two light beams emanating from the same source are sent to the plane surface of the photosensitive layer, causing interference fringes on the whole of the surface to be exposed. The existence of this interference leads to variable exposure of the surface of the photosensitive layer, which is then subjected to a chemical substance having the property of dissolving the material according to its degree of exposure. Chemical etching consequently takes place, insofar as the interference fringes are converted to variations of relief after dissolution of certain parts of the exposed layer of photosensitive material.

Exposure at a plurality of angles (for one of the two beams) in this particular case leads to the possibility of manufacturing a combiner with multiplex network at the surface, capable of reproducing distinct colors which are not superimposed, on the basis of an incident beam coming from a projection device distinguishing zones of different colors.

Next, the relief surface is subject to deposition of a thin conductive layer, making it possible to subsequently apply electroforming methods to obtain a mold. The latter is finally used to transfer the diffractive relief structure to an element made of transparent plastic material by mass production means such as embossing or injection. It is thus possible to obtain a monolayer combiner made of transparent plastic, of which the diffractive structures are etched on the surface, and are in reality diffractive networks of a relief surface. Such a method of manufacture allows high stability of optical characteristics, the diffractive component (combiner) further being perennial in time, since it consists of a simple monomaterial plastic support of which the surface reliefs are obtained by embossing, or directly during manufacture of the components by molding, in which case reproduction of the reliefs is uniform and homogeneous.

The use of a spherical wave, apart from the possibility of obtaining all the necessary optical functions for the head-up vision function, makes it possible to do without the lens function at the output of the projection system conventionally used in head-up display devices for automobile vehicles. Interference of the spherical wave with a plane wave, by creating a diffractive network with variable pitch with curved fringe lines, makes it possible to use any beam at the output of the projection unit, without the need to collimate it. The fringes obtained are curved, and concentric about a central point. They make it possible to obtain constant enlargement of the virtual image.

The projection unit comprises at least one light source producing a projected light beam directed towards a display provided to form a source image transmitted towards the diffractive combiner. The source image is diffracted by transmission or reflection across the combiner, to produce the virtual image on the opposite side to the driver in relation to the combiner.

A refractive component comprising a plane face oriented perpendicularly to the axis of the beam with spherical wave and a curved face with different radii of curvature is placed on the path of the beam with spherical wave, so as to create zones with variable enlargement on the diffractive combiner. Enlargement is in fact on the one hand controlled by the radius of curvature of the spherical wave, and on the other hand by the distance separating the projection unit from the combiner.

This refractive component is introduced into the path of the beam of the spherical wave, and modifies the wave. For this purpose it presents a curved face of which the profile is calculated digitally in order to allow a change of the spherical wave front, and also to correct any aberrations and distortions. This profile can lastly be provided in order to modify the spherical wave with wave front emanating from a single point, into several spherical waves of which the convergence points are different. The interference of these different wave fronts with the plane wave will then generate a set of fringes having different radii of curvature. On the combiner, this will lead to producing distinct sets of fringes distributed over different zones, each zone then corresponding to a set of curved fringes having a different central point to that of the other fringes situated in the other zones.

The possibility of enlargement controlled by zone is advantageous insofar as the final combiner, due to the modulations made to one of the incident beams, may comprise several zones carrying out different enlargement of the signals. These zones may, if occasion arises, be combined with different colors, and some information which is more important to the driver can then be displayed in his field of vision with more discriminating color and size.

The curves of this refractive component are calculated mathematically to control the different levels of enlargement on the above-mentioned zones of the combiner. On the basis of generation by computer of this refractive element, it can then be manufactured of substantially rigid plastic material or glass. The matrix resulting from the method detailed above will therefore have variable enlargement, like the plastic combiner obtained at the end of the process, which function is added to the other optical functions of the combiner.

Furthermore, according to one possibility, the solid substrate of the matrix on which the deposition of photosensitive material is carried out may be made of glass or quartz, and the mold used to transfer the diffractive relief structure to a plastic element can for example be made of nickel.

Said transfer is effected by mass production means, as mentioned above, for example of the embossing or injection type, which allows the existence of the surface diffractive networks.

In one configuration with reflected light, the plastic material of the combiner preferably has an index of reflection making it possible to have a level of transparency greater than that of a vehicle windscreen. The combiner can in fact be placed against the windscreen, or directly integrated in the plastic layer of a windscreen, and the reflection characteristics are then supported by the windscreen and not by the combiner.

In the case of reflected light, the virtual image placed in the driver's field of vision has a level of luminance lower than that obtained in a configuration with transmitted light, and the efficiency of diffraction must further be increased by control of the depth of the relief.

This is controlled by an application of the chemical etching substance to the photosensitive layer for a length of time which determines the depth of the reliefs to be obtained. For a long etching time, the reliefs of the fringes have a practically sinusoidal appearance, whereas in the case of shorter application, the external peaks appear leveled off, as shown for example in FIG. 8.

It should be noted that control of the depth of relief on the surface of the matrix also depends on the time of exposure to recording.

According to one alternative in which the reflective characteristics are not supported for example by the windscreen, it may also be possible to add at least one reflective layer deposited on the diffractive surface of the combiner.

To be even more precise, this reflective layer may be chosen for its selectivity in relation to at least one wavelength of the light beams.

The number of selective reflective layers may be identical with the number of colors produced by the projection unit, and they are then superimposed, each one reflecting only the wavelength which corresponds to it and being transparent to the others.

The method of the invention lastly makes it possible to obtain a combiner made of transparent plastic material in the form of a plastic plate of plane appearance of which one of the surfaces comprises diffractive structures, which makes it possible to work with transmitted and reflected light at the same time, with different efficiency of diffraction as mentioned above.

The invention also concerns a display device, in particular capable of performing a head-up display function for an automobile vehicle, comprising a projection unit which produces a light beam designed to be directed towards a diffractive combiner manufactured by the method described above, making it possible to project images, particularly information on functioning or driving of the vehicle, in the form of a virtual image situated in the driver's field of vision.

In one embodiment with several colors, the projection unit comprises a display designed to form source images backlit by light sources with at least two colors of different wavelengths, and a diffractive component generating a backlighting Fig. delimiting at least one zone of the display which is placed at the output of each source, perpendicularly to the axis of the beam emitted by the source, the delimited zones being backlit by one color only.

The diffractive components in fact allow correct shaping of the necessary backlighting Fig., for example for the purpose of illuminating certain zones of the display in red (in particular warnings), others in green (information connected with speed, for example), and still others in blue (information relating to navigation).

For obvious configurational reasons in the presence of several light sources in the projection device, at least one light source is oriented at an angle $\alpha$ to the normal to the plane of the display. This characteristic is used to reduce the dimensions of the diffractive components in order to produce them by micro-manufacture.

These diffractive components placed at the output of the light sources are in fact multilevel structures, which makes it possible to reduce the light output concentrated in the central order while improving the uniformity of lighting and reducing light losses (the whole of the light energy is distributed in one zone of the display).

However, the manufacture of these multilevel elements involves going into extremely fine details of structures during micro-manufacture, which is attenuated if the sources, and hence the diffractive components, are at an angle to the display and to its normal, since the Fourier window of calculation of said element is then reduced by a factor of $\cos \alpha$, which makes it possible to increase correlatively the critical dimensional value of micro-manufacture.

As already mentioned—and this is a major advantage of the invention—the diffractive combiner is constructed in the form of a transparent monomaterial plate. In the particular application to a head-up display for a vehicle, at least one face of the diffractive combiner can in addition be provided with a protective layer or covering.

Preferably, the display of the projection device is a liquid crystal display.

Also preferably, the combiner comprises diffractive optical elements configured to position the virtual image at a given distance in front of the combiner at a precise angle of inclination to the driver's axis of vision.

According to one possible configuration, the light sources are diodes each producing a light beam having spatial and temporal coherence, for example laser diodes, and the display forming the source image can be provided with an optical diffusion layer having a predetermined angular opening.

BRIEF DESCRIPTION OF DRAWINGS

The invention will now be described in more detail, with reference to the attached drawings, in which:

FIG. 1 is a schematic view which represents the passenger compartment of an automobile vehicle equipped with a head-up display device operating with reflected light according to the teaching of the invention;

FIG. 2 is a view similar to the one above for a device operating with transmitted light;

FIG. 3 is a view in axial section which represents schematically the functioning of the projection unit with which the display device of FIG. 1 is equipped;

FIG. 4 is a diagram illustrating the advantage of the diffractive components placed at the output of the light sources in the projection unit;

Figure 5:
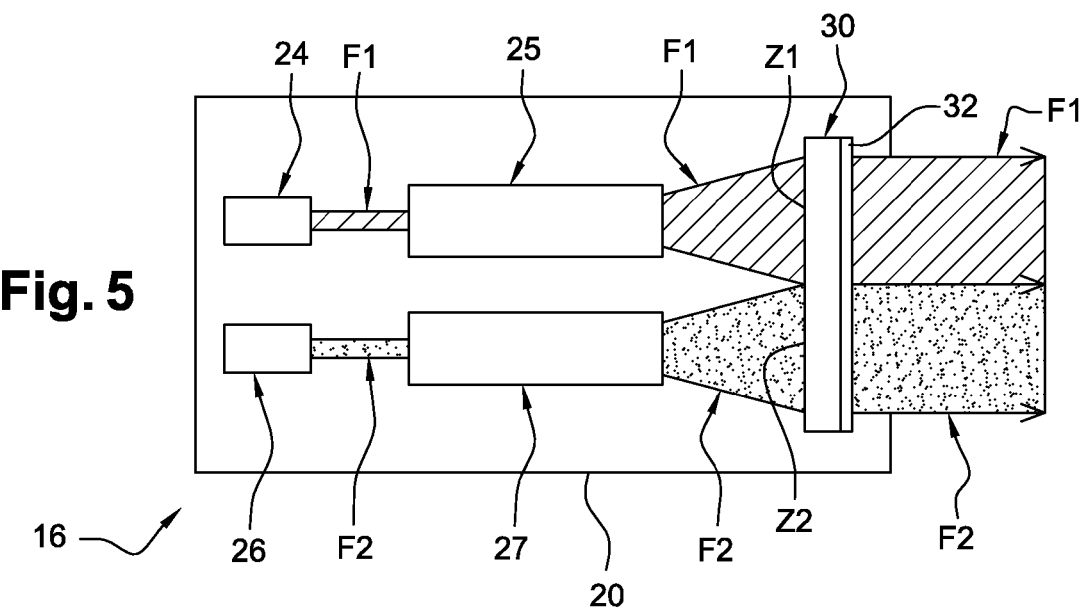
FIG. 5 is a view in axial section which represents schematically one embodiment of the projection unit with which the display device of FIG. 1 is equipped.

DESCRIPTION OF THE PREFERRED
EMBODIMENTS OF THE INVENTION

Below, identical or similar elements will be referred to by the same references.

In FIG. 1, the interior of an automobile vehicle 10 comprising a dashboard 12 and a head-up display device 14 constructed according to the instructions of the invention has been shown schematically. According to the embodiment shown (with reflected light), the head-up display device 14 is disposed on the dashboard 12, in the proximity of the windscreen 15.

The head-up display device 14 according to the invention comprises a projection unit 16 and a diffractive combiner 18 which is situated in the axis of vision of the driver C and which is provided in order to display information on functioning or driving of the vehicle in the form of virtual images 19 positioned in front of the windscreen 15 in the driver's field of vision.

According to the embodiment shown in FIG. 3, the projection unit 16 allows the display of information in three colors (for example blue, red and green) by means of three light sources 22, 24, 26, preferably laser diodes emitting in the visible range, which produce light beams shaped by diffractive components 23, 25, 27 before being diffused towards a display 30 forming the source image. The display 30 is for example a liquid crystal display, and it is shown in a front view above the diagram integrating the light sources 22, 24, 26.

The diffractive shaping components 23, 25, 27 aim to produce light beams with a cross-section adapted to the shape of particular zones delimited in the display 30. The display 30 is configured to produce source images representing the information on functioning or driving of the vehicle. It comprises zones Z1, Z'1, Z2, Z3, Z'3 lit by the sources 22, 24, 26 respectively so as to transmit information of a variable nature in different colors, the combiner 18 reproducing said information in the virtual image 19 in adjacent display zones. The multiplex diffractive reliefs of the combiner 18 in fact treat the complex beam emitted by the projection unit 16 in a differentiated manner according to the incident wavelength and reproduce the information, as backlit in the projection unit 16, in the virtual image 19.

The diffractive shaping components 23, 25, 27 are multi-level structures. This technological choice makes it possible to reduce the light output concentrated in the central order, which improves the uniformity of lighting and reduces light losses, since all of the light energy is distributed in the zone of the display. Manufacture of the multilevel elements makes it necessary to go into very fine structural details during micro-manufacture. In order to make the micro-manufacture of these elements possible, two of the sources 22, 26 shown in FIG. 3 are oriented with a given inclination. They are for example positioned with an inclination of angle α (in absolute value) to the normal to the display 30. This makes it possible to reduce the Fourier window necessary for calculation of the diffractive shaping element and hence to increase the critical dimensional value for micro-manufacture of a multilevel network. The relationship between the dimensions on the display and the dimensions from calculation (see in FIG. 4) will be in this case: Lcalcul=Lreel·cos α.

This technique then makes it possible to use all of the zone on the display 30 using a diffractive component produced by using critical dimensions which can easily be produced by micro-manufacture.

According to the embodiment shown in FIG. 5, the projection unit 16 is mounted in the interior of a housing 20. The housing 20 in this case contains two light sources 24, 26 with different colors, preferably laser diodes emitting in the visible range, which produce a first light beam F1 and a second light beam F2 with different wavelengths. The light beams F1, F2 are shaped by optical shaping elements 25, 27 before being diffused towards a display 30 forming the source image. The display 30 is for example a liquid crystal display. The optical shaping elements 25, 27 aim to produce light beams F1, F2 with cross-sections adapted to the shape of the display 30. The display 30 is configured to produce source images representing the information on functioning or driving of the vehicle. The display 30 is preferably provided with an optical diffusion layer 32 having a predetermined angular opening.

The display 30 is configured so as to have several zones Z1, Z2 depending on the type of information displayed and the display color in the virtual image 19. For example, it comprises a first zone Z1 for displaying the principal information such as indications of a change of direction of the vehicle steering system, or the momentary speed of the vehicle, and a second zone Z2 for displaying warning information such as exceeding the speed limits or auxiliary information such as GPS coordinates. Naturally, the display 30 could comprise more than two display zones and more than two display colors, as mentioned for example with reference to FIG. 3.

The shaping elements 25, 27 are configured so as to illuminate the zones Z1 and Z2 of the display 30. The display 30 and the light sources 24, 26 are controlled by an electronic unit (not shown).

Figure 6:
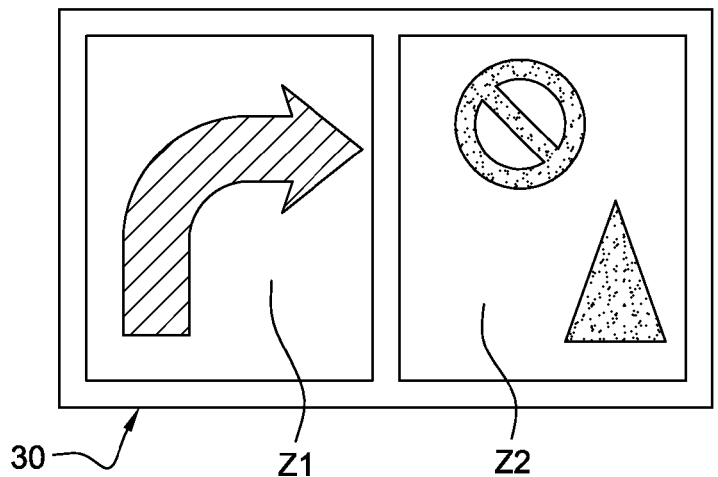
FIG. 6 is a front view which represents schematically the zones of the display with which the projection unit of FIG. 5 is equipped.

FIG. 6 shows the display 30 comprising the two lighting zones Z1, Z2 and source images produced in each of these zones.

The diffractive combiner 18 can also function with transmitted light, as shown in FIG. 2. It is then arranged between the projection unit 16 and the eyes of the driver C so that the light beam emanating from the source image, downstream of the projection unit 16, is diffracted by transmission across the diffractive combiner 18 to produce a virtual image 19 situated on the opposite side to the driver C in relation to the diffractive combiner 18.

Advantageously, the diffractive combiner 18 is a transparent plastic component comprising diffractive optical elements at the surface, and is composed of a single layer of the same transparent plastic material. The diffractive optical elements are provided for positioning the virtual holographic image 19 at a given distance in front of the diffractive combiner 18, and they are also configured for a function of enlargement of the source image. In a configuration with reflected light as shown in FIG. 1, the combiner 18 can be placed against the windscreen 15 or integrated in it, and it then has greater transparency than said windscreen 15.

Figure 7:
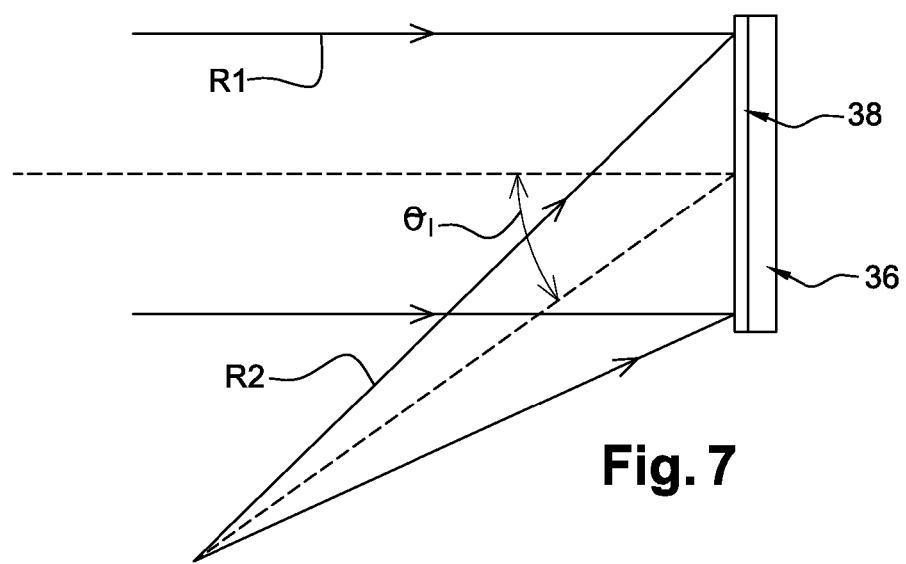
FIG. 7 is a diagram illustrating the principle of production of a diffractive combiner by lithography.
Figure 8:
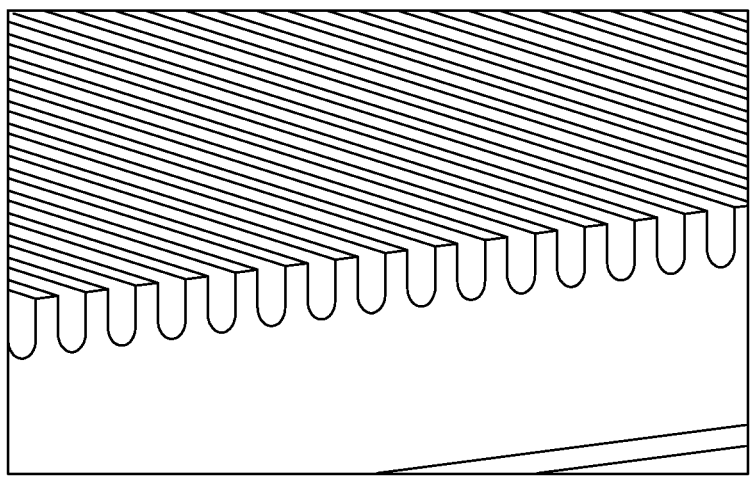
FIG. 8 is a microscope photograph showing the diffractive optical elements produced at the surface of the diffractive combiner.

The diffractive combiner 18 is produced by nano-lithography by laser interference. A matrix is first recorded, considering the principle shown in FIG. 7 where a photosensitive plate 36 has been shown. In this drawing, the beams R1 and R2 represent the object beam and the reference beam. The two beams allow the creation of interference on the same side of the photosensitive plate 36. The plate used for recording is composed of a deposit of photosensitive resin in a uniform layer 38 on a plate 36 (quartz, silicon, glass, etc.). The plate 36 serves as a mechanical support only. The interference of R1 and R2 on the photosensitive layer 38 makes it possible to expose precise zones of the photosensitive layer 38, which modifies the solubility of the resin in these zones. The exposed zones of the photosensitive resin thus become more or less soluble compared with the other zones. Chemical etching allows suppression of the zones which are unexposed (or exposed, depending on the type of photosensitive resin: negative or positive) so as to obtain a diffractive surface structure, as can be seen in FIG. 8.

To display an inclined virtual image when using the head-up display device of the invention, it is sufficient to produce a recording assembly in which the beam R1 is inclined to the normal to the surface of the photosensitive layer 38 by an angle corresponding to the angle of inclination which it is wished to obtain for the virtual image.

The values of the angle $\theta_i$ are calculated to correspond to the different wavelengths used in backlighting of the display 30, in this case three, since there are three light sources (see in FIG. 3). Each value of the angle $\theta_i$ is calculated so as to diffract the light associated with the wavelength $\lambda_i$ of a lighting zone Z1, Z'1, Z2, Z3, Z'3 and with a clearly defined direction.

Recording is done by producing a single assembly, then production of the matrix consisting of the plate 36 and the photosensitive layer 38 is done in three successive recordings. Throughout the recording procedure, the photosensitive layer 38 is kept fixed and the same laser source is used. The procedure is begun with a first angle $\theta_1$ of the reference beam (R2) (which corresponds to the projector backlighting wavelength $\lambda_1$). Next, the beam R2 is repositioned to obtain the angle $\theta_2$ (which corresponds to the second backlighting wavelength). The procedure is continued in the same way to generate the diffractive network corresponding to the wavelength $\lambda_3$.

Figure 9:
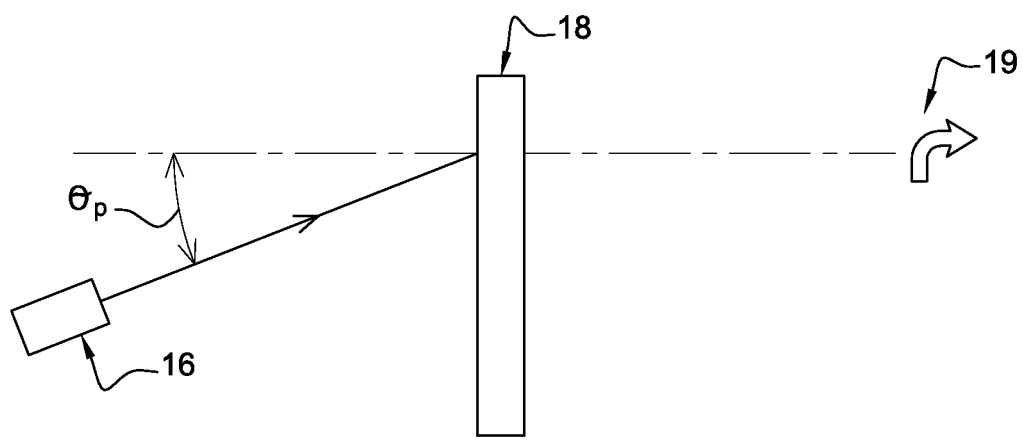
FIG. 9 is a diagram illustrating the angle of illumination to the virtual image.

The choice of angle depends at the same time on the angle of the projector $\theta_p$ to the axis of vision (see in FIG. 9), the wavelength of the recording source $\lambda_e$ and the wavelength of the backlighting zone in question Z1, Z'1, Z2, Z3, Z'3, and the relationship yielding $\theta_i$ is the following:

$$\theta_i = \arcsin\left(\frac{\lambda_e}{\lambda_i} \cdot \sin(\theta_p)\right). \qquad \text{Eq. 2}$$

The result obtained is multiplexing of interference fringes on the same photosensitive layer 38. "Development" of this photosensitive layer 38 exposed by a conventional chemical etching method will make it possible subsequently to obtain multiplex networks on the surface of the combiner 18. It is this layer having the surface networks which will act as the matrix that can be used to produce a nickel mold which makes it possible to transfer the networks to a transparent plastic material in a final step.

The recording method set forth above makes it possible to position diffraction orders different to the first order outside the driver's field of vision. Only the first orders corresponding to each wavelength will be placed in the field of vision and juxtaposed so as to re-form the same zones as at the projector output.

The virtual image 19 has a high luminance, since the efficiency of diffraction of the diffractive combiner is greater than 70%.

On the basis of the matrix produced by the above method, the diffractive combiner can be produced in a reproducible industrial manner by plastic injection or embossing.

The invention claimed is:

1. Method of manufacturing a monolayer diffractive combiner used in a head-up display device for an automobile vehicle, said head-up display comprising a projection unit provided with a display backlit by n≧1 light source(s) of wavelength(s) $\lambda i$, where i=1 to n, said light source(s) illuminating at least one zone of said display, and sending a light beam towards said combiner at an angle $\theta p$, said method of manufacturing comprising the following steps:
   a) depositing a photosensitive layer having a uniform thickness on a plane surface of a solid substrate;
   b) exposing the photosensitive layer to an interference of two light beams R1 and R2 emanating from a single laser source to form exposed zones of interference fringes corresponding to the interference of the two light beams;
   c) converting the exposed zones to form a diffractive relief structure in the photosensitive layer, and manufacturing a mold for reproducing the diffractive relief structure; and
   d) using said mold to transfer the diffractive relief structure of the substrate onto an element made of homogeneous transparent plastic material effective to form the monolayer diffractive combiner characterized as having a diffractive surface, wherein step b) is carried out n times, by the two light beams R1 and R2 emanating from the single laser source, said two light beams characterized as having a wavelength $\lambda e$, and each time distinguished by emanating with an angle $\theta i$, where i=1 to n, between the beam R1 and the beam R2 equal to $\theta i=\arcsin((\lambda e/\lambda i)*\sin(\theta p))$, wherein one of the interfering beams is characterized as being divergent and having a spherical wave, and the other beam is characterized as being a plane wave, wherein their interference generates a diffractive network with variable pitch with curved fringe contour lines.

2. Method of manufacturing a diffractive combiner according to claim 1, characterized in that a refractive component comprising a plane face oriented perpendicularly to an axis of the beam with spherical wave and a curved face with different radii of curvature is placed on the path of the beam with spherical wave, so as to create zones with variable enlargement on the diffractive combiner.

3. Method of manufacturing a diffractive combiner according to claim 2, characterized in that said refractive component is made of plastic material or glass.

4. Method of manufacturing a diffractive combiner according to claim 1, characterized in that the solid substrate is made of glass or quartz.

5. Method of manufacturing a diffractive combiner according to claim 1, characterized in that conversion of the exposed zones corresponding to the interference fringes to variations of relief comprises the following steps:
   applying, for a given length of time, a chemical etching substance to the exposed photosensitive layer to convert the interference fringes to the diffractive relief structure of the photosensitive layer and create a matrix;
   depositing a conductive layer on the diffractive relief structure; and
   applying an electroforming method to the conductive layer in order to obtain a mold.

6. Method of manufacturing a diffractive combiner according to claim 5, characterized in that said mold is made of nickel.

7. Method of manufacturing a diffractive combiner according to claim 1, characterized in that transfer of the diffractive relief structure to the element is done by mass production means of the embossing or injection type.

8. Method of manufacturing a diffractive combiner according to claim 1, characterized in that the plastic material of the combiner has an index of reflection making it possible to have a level of transparency greater than that of a vehicle windscreen.

9. Method of manufacturing a diffractive combiner according to claim 8, characterized by an application of a chemical etching substance to the photosensitive layer for a length of time which determines the depth of the reliefs to be obtained, on which depends the efficiency of diffraction.

10. Method of manufacturing a diffractive combiner according to claim 1, characterized in that at least one reflective layer is deposited on the diffractive surface of the combiner.

11. Method of manufacturing a diffractive combiner according to claim 10, characterized in that said reflective layer has a selectivity in relation to at least one wavelength of the light beam emitted by the projection unit.

12. Head-up display device for automobile vehicle designed to project images, particularly information on functioning or driving of the vehicle, in the form of a virtual image situated in a driver's field of vision, comprising a projection unit and a diffractive combiner manufactured by the method of claim 1.

13. Head-up display device according to claim 12, characterized in that the projection unit comprises a display designed to form source images backlit by light sources with at least two colors of different wavelengths, and a diffractive component generating a backlighting figure delimiting at least one zone of the display is placed at the output of each source, perpendicularly to an axis of the beam emitted by the source, each of the delimited zones being backlit by one color only.

14. Head-up display device according to claim 13, characterized in that at least one light source is oriented at an angle $\alpha$ to the normal to the plane of the display.

15. Head-up display device according to claim 13, characterized in that the diffractive components placed at respective outputs of the light sources are multilevel structures.

16. Head-up display device according to claim 13, characterized in that the diffractive combiner is constructed in the form of a transparent monomaterial plate.

17. Head-up display device according to claim 13, characterized in that the display of the projection unit is a liquid crystal display.

18. Head-up display device according to claim 13, characterized in that the combiner comprises diffractive optical elements configured to position the virtual image at a given distance in front of the combiner at a precise angle of inclination to a driver's axis of vision.

19. Head-up display device according to claim 18, characterized in that the light sources are diodes each producing a light beam having spatial and temporal coherence.

20. Head-up display device according to claim 18, characterized in that the display forming the source image is provided with an optical diffusion layer having a predetermined angular opening.

* * * * *